United States Patent [19]

Kissel

[11] Patent Number: 4,549,254

[45] Date of Patent: Oct. 22, 1985

[54] BUCK-BOOST REGULATED D.C. TO D.C. POWER SUPPLY

[75] Inventor: William R. Kissel, Milford, Mich.

[73] Assignee: Chrysler Corporation, Highland Park, Mich.

[21] Appl. No.: 463,179

[22] Filed: Feb. 3, 1983

[51] Int. Cl.⁴ .............................................. H02P 13/22

[52] U.S. Cl. ...................................... 363/21; 363/101; 323/222; 323/224; 323/259

[58] Field of Search ............... 323/222, 223, 224, 259, 323/344, 345; 363/20, 21, 101

[56] References Cited

U.S. PATENT DOCUMENTS

| | | | |
|---|---|---|---|
| 4,055,740 | 10/1977 | Nakamura et al. | 323/344 |
| 4,084,219 | 4/1978 | Furukawa et al. | 363/21 |
| 4,168,477 | 9/1979 | Burchall | 323/224 |
| 4,245,286 | 1/1981 | Paulkovich et al. | 363/21 |

OTHER PUBLICATIONS

IBM Disclosure Bulletin; vol. 22, #7, Dec. 1979.

Johnson; High-Voltage Power Supply . . . ; Apr. 1, 1975; Electronic Design.

*Primary Examiner*—William H. Beha, Jr.
*Assistant Examiner*—Jeffrey Sterrett
*Attorney, Agent, or Firm*—Mark P. Calcaterra

[57] ABSTRACT

A regulated power supply for supplying DC output voltage and current to an electronic control system of an internal combustion engine, designed especially for automotive applications and cold cranking conditions encountered therein, is disclosed. The power supply has a series switching regulator section having a transformer provided with two windings, and a shunt switching regulator section that shares the transformer with the series regulator section. When normal battery voltages are available, the power supply through its series regulator section operates in a voltage dropping mode, intermittently passing current through the primary winding of the transformer to maintain the desired output voltage. When low battery voltages are encountered, such as during cold cranking conditions, the shunt regulator section of the power supply operates in a voltage boosting mode to maintain the desired output voltage. The voltage boosting function is accomplished by intermittently shunting current from the primary winding towards ground, and utilizing the resultant magnetic energy stored in the core of the transformer to boost the voltage available to the load. Mutual inductance between the primary and secondary windings allows energy stored in the core of the transformer as a result of current flowing through the primary winding to be beneficially delivered through the secondary winding to the output of the power supply during both modes of power supply operation, thereby improving overall power supply efficiency and reducing power supply cost and complexity.

15 Claims, 3 Drawing Figures

BUCK-BOOST REGULATED D.C. TO D.C. POWER SUPPLY

BACKGROUND AND SUMMARY OF THE INVENTION

This invention relates generally to the field of electronic control systems for automotive engines and more particularly to power supplies for microprocessor-based engine fuel control systems.

In this day of rising fuel costs, the conservation of energy through the use of electronically controlled engines and fuel systems has become increasingly important. One major problem in equipping an automotive vehicle with a suitable electronic control system is that under cold cranking conditions, the battery supplying electrical power to the vehicle may have its output voltage drop to as low as four volts and still start the engine. Since microprocessor-based engine control systems typically require a tightly regulated five volt supply capable of delivering hundreds of milliamps, conventional series linear regulators or series switching regulators are incapable of delivering the necessary output when the battery output is at four volts, since neither type of regulator can boost voltage.

For a vehicle equipped with microprocessor-based engine control systems, the problem presented by low battery voltage during cold cranking could be solved in several ways. First, the vehicle could be equipped with a larger than otherwise necessary battery and charging system to prevent the battery voltage from dropping below acceptable levels when the vehicle is started. Second, the electronic engine control system could be equipped with sufficient intelligence at the input/output points of the system to start the engine without utilizing the intelligence of the microprocessor. Third, the vehicle could be equipped with an electronic power supply capable of boosting battery voltage as required to handle low battery voltage conditions encountered during cold cranking.

In addition to being expensive, the first option above involves a significant weight penalty which partially defeats the purpose for using microprocessor-based engine control systems, that is the conservation of fuel. The second option may be a suitable choice for control systems not involving the sophisticated regulation of fuel during start-up under cold cranking conditions. It is felt, however, that microprocessor control of fuel delivery during start-up conditions is desirable, if not essential, to provide the control flexibility needed to be able to quickly adapt to future advances in fuel control technology, including those in individual cylinder fuel injection systems and throttle body injection systems. Thus, controlling fuel delivery during engine start-up by providing intelligent input-output circuitry is believed to be unduly burdensome, not only due to the sophistication which would be required, but also due to the inherent inflexibility of such circuitry.

The third option, then, is deemed to be preferred with microprocessor-based engine control systems which include fuel control because it provides full microprocessor capability to control fuel delivery during engine start-up, and also because it is believed to represent in many cases the least expensive option since intelligent input-output circuitry is not needed.

Accordingly, it is an object of the present invention to provide an electronic power supply for regulating electrical power available from an automotive battery to produce a suitable DC output voltage and current for operating an electronic engine control system.

Another object of the present invention is to provide a power supply for providing suitable voltage and current to operate a microprocessor-based engine control system during cold cranking conditions when the output voltage of the vehicle's battery drops as low as four volts.

Yet another object of the present invention is to provide a power supply which has minimal power dissipation so as to optimize reliability, and to allow location of the power supply circuitry in close proximity to the other electronics in a microprocessor-based engine control system.

One more object of the present invention is to provide a power supply having a shunt switching regulator section which provides a variable voltage boost function as needed to compensate for the variable low battery voltages encountered during engine start-ups.

An additional object of the present invention is to provide a power supply which is relatively inexpensive and simple to fabricate.

Still another object is to provide a power supply having a series switching regulator section provided with a two-winding transformer, and a shunt switching regulator section, wherein the two sections share the same transformer thereby minimizing cost.

Other objects, features and advantages of the present invention will become apparent from the subsequent description and the appended claims taken in conjunction with the accompanying drawings.

The present invention achieves the foregoing objects by providing a power supply having a series switching regulator section provided with a two-winding transformer, and a shunt switching regulator section that shares the transformer with the series switching regulator section. The series regulator section, by utilizing the transformer, steps down the supply voltage when necessary to produce the desired DC output voltage, while the shunt regulator section, by utilizing the transformer, steps up or boosts the supply voltage when necessary to produce the desired DC output voltage. The use of a switching regulator design for both sections of the power supply provides the required output voltage and current without the unnecessary power dissipation found in linear regulator designs.

The supply voltage boost provided by the shunt regulator section of the power supply is proportional to the drop in battery voltage from its nominal value when the vehicle is running. In this manner, the variable boost provided smoothly compensates for any reduced battery voltages encountered during engine operation, whether they be the greatly reduced battery voltages encountered during cold cranking conditions, or the slight reductions provided by a battery not being properly charged by the alternator system of the vehicle due to such conditions as a loose fan belt and the like.

DETAILED DESCRIPTION OF THE PREFERRED EMBODIMENTS

Figure 1:
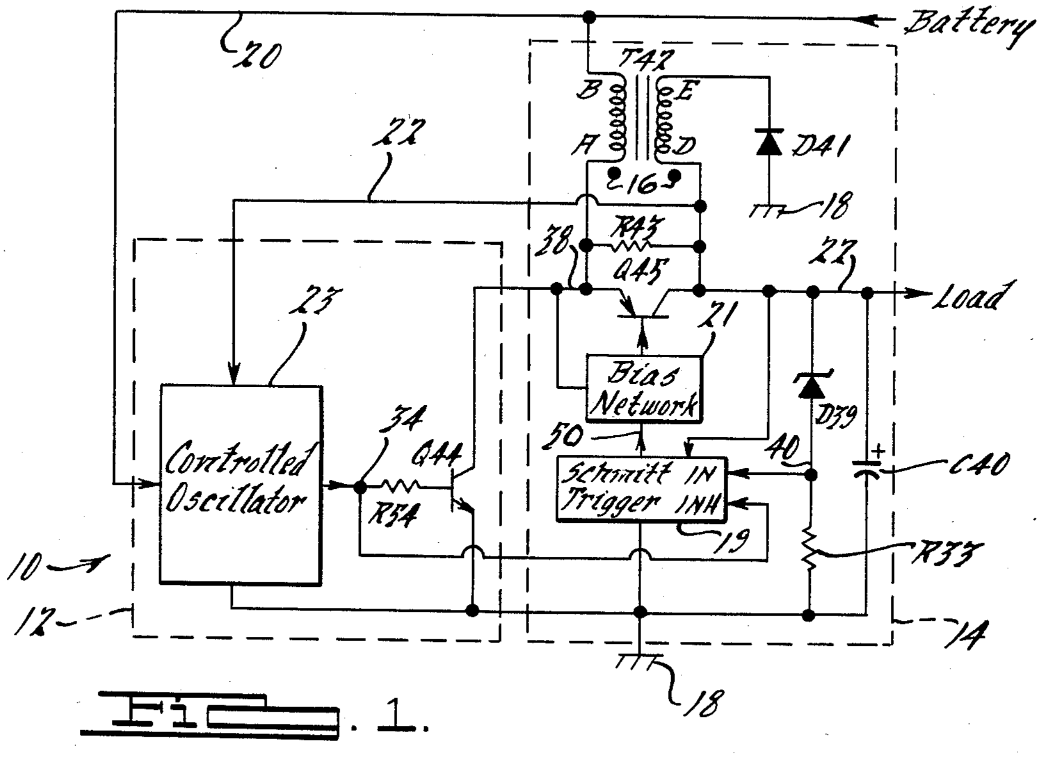
FIG. 1 is a block diagram of the power supply of the present invention.
Figure 2:
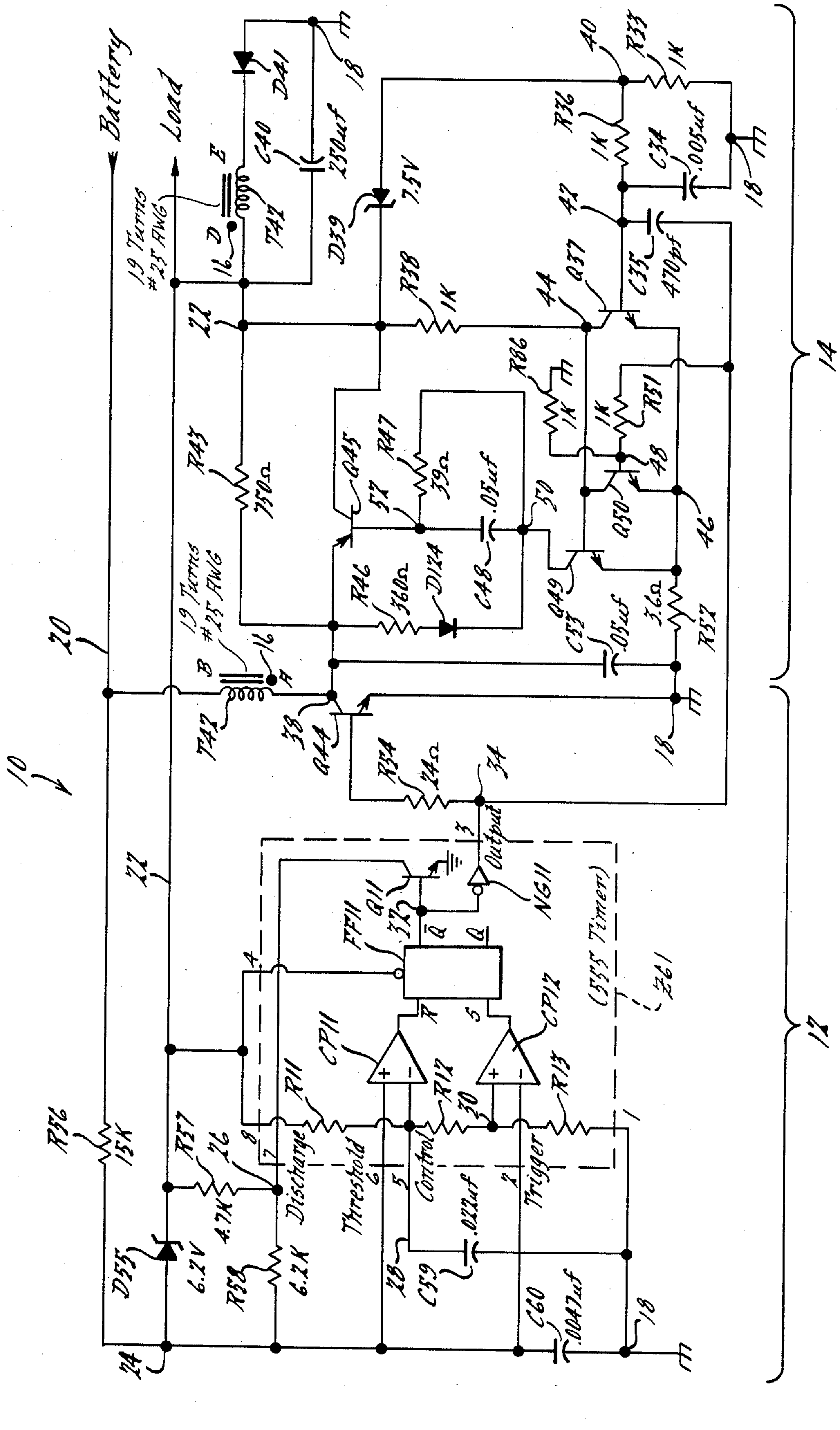
FIG. 2 is an electronic circuit diagram of the power supply of the present invention.

Referring to the FIGS. 1 and 2, a detailed block diagram and a circuit diagram of the preferred embodiment, a power supply 10, of the present invention are respectively shown. Power supply 10 is comprised of a shunt switching regulator section 12 and series switching regulator section 14. Shunt regulator section 12 includes shunt means or a shunt device such as an npn, current shunting, power transistor Q44 and all components leftward thereof in FIGS. 1 and 2. Series regulator section 14 is comprised of all other components shown in FIGS. 1 and 2, including transformer T42 consisting of primary winding BA and secondary winding ED magnetically coupled as indicated by polarity dots 16, free-winding diode D41, and filter capacitor C40. Series regulator section 14 includes switching means or a switching device such as a pnp, power switching transistor Q45. Power to the power supply 10 is furnished by conductor 20 connected to an automotive battery (not shown) of the vehicle (not shown). Regulated DC power from the power supply 10 is made available to the load to be supplied via a conductor 22. (For convenience, conductors will sometimes be called nodes. For example, conductor 20 may be called node 20.)

The power supply 10 has two basic modes of operation: a voltage dropping mode and a voltage boosting mode. The voltage boosting mode is initiated whenever the battery voltage on conductor 20 drops below a level at which series regulator section 14 can, without the assistance of shunt regulator section 12, supply the desired voltage and current to the load. The voltage boosting mode normally occurs when the engine is being started, particularly during cold cranking conditions, and may occur whenever the battery voltage is appreciably below normal for any reason.

In the voltage boosting mode, shunt regulator section 12 causes transformer T42 to deliver electrical power to the load at node 22, and preferably to the rest of series regulator section 14, at voltages above the battery voltage then available on conductor 20. To improve power supply efficiency, the series regulator section 14 is preferably allowed to continue operating during the voltage boosting mode, except for those brief intervals of time when current passing through winding BA is being shunted via shunt transistor Q44 towards ground 18. It is to be appreciated, though, that shunt regulator section 12 operating in conjunction with transformer T42, free-wheeling diode D41 and filter capacitor C40, without any of the other component of series regulator section 14, can satisfactorily regulate the output voltage of the power supply 10.

The voltage dropping mode occurs whenever the battery provides sufficient voltage for series switching regulator section 14 by itself to maintain the desired load voltage and current. It is in this mode that the power supply 10 typically operates when the vehicle's engine is running and the vehicle's battery charging system is operating normally.

The overall operation of series switching regulator section 14 during the voltage dripping mode may now be explained by referring to FIG. 1. Series regulator section 14 includes a solid-state switching control circuit means for controlling the operation of the switching means, transistor Q45, in response to the output voltage on the output node, node 22. The switching control circuit means shown in FIG. 1 is comprised of Schmitt trigger circuitry 19, bias network 21, voltage reference zener diode D39, and resistor R33. During normal operation of series regulator section 14, electrical current from the battery flows intermittently from conductor 20 through winding BA and then through the emitter-to-collector path of transistor Q45 to node 22 as transistor Q45 cycles on and off under the control of the switching control circuit means. From conductor 22, this current is distributed to the load and the filter capacitor C40, which helps maintain the desired load voltage by smoothing output voltage variations caused by the intermittent cycling on and off of transistor Q45. Current from conductor 22 is also distributed to the series combination of diode D39 and resistor R33 as a means of providing a feedback signal at node 40 indicating where the actual output voltage on conductor 22 is with respect to the desired output voltage to be maintained by series regulator section 14.

In response to the varying feedback signal at node 40 sensed by input IN of Schmitt trigger 19, the Schmitt trigger repetitively turns switching transistor Q45 on and off. The output 50 of Schmitt trigger 19 normally turns on when the actual output voltage at node 22, as indicated by the feedback signal at node 40, is slightly below the desired output voltage. The output 50 turns off when the actual output voltage at node 22 rises some predetermined fraction of a volt above the voltage level where the Schmitt trigger turned on. (The precise turn on and turn off points or voltage levels of Schmitt trigger 19 may be adjusted to achieve acceptable load regulation).

Bias network 21 relays the stat of output 50 of Schmitt trigger 19 to the base of switching transistor Q45. It also serves to assure that transistor Q45 truns off solidly, as will be explained in detail below.

Those skilled in the art will appreciate that the switching control circuit means may take other suitable or conventional forms without departing from the scope of the present invention. For example, Schmitt trigger 19 may be replaced with any circuitry exhibiting the necessary hysteresis in response to a feedback signal indicating the error between the desired and actual output voltage at node 22.

Additional features of series regulator section 14 shown in FIG. 1 may now be more fully described by way of discussion of the preferred embodiment of the present invention shown in FIG. 2. In the preferred embodiment, the desired load or output voltage at node 22 is nominally 8.2 volts for normal battery voltages. Schmitt trigger 19 is preferably adjusted to turn output 50 on when the voltage at node 40 drops approximately to 0.7 volts and any voltage thereunder. To achieve 0.7 volts at node 40 when the output voltage at node 22 is 8.2 volts, a zener diode having a reverse breakdown voltage of 7.5 volts is used as diode D39.

When the output voltage at node 22 is less than 8.2 volts, the reverse bias current through diode D39 is insufficient to maintain node 40 at 0.7 volts, and thus output 50 of Schmitt trigger turns on, which turns on transistor Q45 hard through bias network 21. When transistor Q45 is conducting, current from node 20 flows through the BA winding of transformer T42 into node 22. This current flow increases exponentially, causing the voltage at node 22 to rise. When the load voltage at node 22 rises sufficiently to cause appreciable avalanche current through diode D39, the voltage at node 40 reaches the turn-off point of Schmitt trigger 19, turning off output 50, which turns off transistor Q45 immediately.

Switching off transistor Q45 stops the current flow through winding BA. As a result, the magnetic field previously generated by the flowing current in winding BA begins to collapse, inducing a reverse bias voltage in winding BA. This in turn causes the voltage at node 38 to begin to rise sharply. As will be more fully understood by way of the specific embodiment shown in FIG. 2, bias network 21 helps assure that the switching transistor Q45 remains off as the voltage at node 38 begins to rise on account of the voltage surge produced by the reverse biasing of winding BA.

Winding ED is magnetically coupled to and preferably shares a common core with winding BA to held dissipate residual magnetic energy stored in the core of winding BA. This allows the collapse of the magnetic field caused by the cessation of current through winding BA to induce a voltage in winding ED. When the induced voltage in winding ED slightly exceeds the load voltage at node 22, current flows through diode D41 and winding ED. In this manner, the excess energy which would otherwise be trapped in the core of transformer T42 is beneficially delivered via winding ED to the load at node 22. Free-wheeling diode D41 prevents current from flowing from node 22 through winding ED to ground 18, but allows current to flow from ground 18 through winding ED to node 22.

As the electrical power provided via windings BA and ED to the load and capacitor C40 is consumed, the output voltage at node 22 will fall below 8.2 volts, and foregoing sequence of operation of series regulator section 14 will repeat to maintain the load at the desired output voltage.

Still referring to FIG. 1, the overall operation of shunt switching regulator section 12 during the voltage boosting mode may now be explained. Shunt regulator section 12 is comprised of a controlled oscillator 23, shunt power transistor Q44, and current limiting base resistor R54, all of which operated in conjunction with transformer T42 to deliver electrical power to node 22 when the series switching regulator section 14 is or may be unable to continuously maintain the desired output voltage due to low battery voltage. Circuitry within controlled oscillator 23 monitors the battery voltage on conductor 20 and the actual load voltage at node 22 to determine when the voltage boosting function is required. When series regulator section 14 can maintain the desired output voltage without the aid of the shunt regulator section 12, the output of controlled oscillator 23 at node 34 remains in the off or low voltage state, which keeps shunt transistor Q44 off. When series regulator section 14 cannot maintain the desired output voltage, this is sensed by controlled oscillator 23 which then oscillates node 34 between a high (on) and low (off) state to cycle shunt transistor Q44 on and off to provide the voltage boosting effect. To optimize the efficiency, line regulation and load regulation of the power supply 10, the duty cycle and frequency of the oscillating output 34 of controlled oscillator 23 are preferably varied so that the size of the voltage boost is proportional to the amount by which the battery voltage is low.

When the output 34 of oscillator 23 turns on, that is goes high, shunt transistor Q44 begins conducting current from node 20 through winding BA towards ground. Node 38 is pulled down to near zero volts when shunt transistor Q44 is conducting. To avoid having current back-flow from the load node 22 through switching transistor Q45 to node 38, the output of oscillator 23 is fed into an inhibit input INH of Schmitt trigger 19. When the INH input is high, it forces the output 50 of Schmitt trigger 19 off. This assures that switching transistor Q45 will be turned off whenever shunt transistor Q44 is turned on.

Once transistor Q44 turns on, the current flowing through winding BA steadily increases. Before this current reaches the saturation point of transistor Q44 or winding BA, output 34 of oscillator 23 goes low, turning transistor Q44 off, which stops the current flow towards ground 18. As a result of having shunted current through transistor Q44 towards ground 18, a significant amount of energy is stored in the core of transformer T42. This energy is substantially delivered to the load at node 22 and will reach there via one or both of two distinct paths.

The first path is through winding ED and free-wheeling diode D41. As described in the operation of series regulator section 14, the collapsing magnetic field produced by the cessation (or appreciable reduction) of current flowing through winding BA causes a voltage to be induced in winding ED. When this voltage slightly exceeds the voltage at node 22, current flows from ground 18 through diode D41 and winding ED to node 22, beneficially delivering energy stored in transformer T42 to the load. It will be appreciated by those skilled in the art that this first path is sufficient in itself to cause the output voltage to exceed and to be maintained above the battery voltage on node 20.

The second path for delivering energy stored in transformer T42 to the load is through switching transistor Q45 when it is conducting. Assuming the load voltage at node 22 is below the desired output voltage to be maintained by series regulator section 14, and assuming the inhibit input of Schmitt trigger 19 is off, transistor Q45 will turn on, allowing the reverse bias voltage of winding BA to pump current from the battery through transistor Q45 to the load. As the load voltage rises above the desired output voltage of series regulator section 14, Schmitt trigger 19 will turn off transistor Q45. The potential energy remaining in the core of transformer T42 at this point is beneficially delivered via winding ED to the load as explained before. In this manner, substantially all of the energy stored in winding BA as a result of shunting current through transistor Q44 towards ground is passed to the load, resulting in excellent power supply efficiency.

To regulate the maximum output voltage at node 22 caused by the voltage boost provided by shunt regulator section 12, controlled oscillator 23 monitors the voltage on node 22. When the voltage at node 22 exceeds the maximum desired level as determined by oscillator 23, oscillator 23 turns off, thereby turning off shunt transistor Q44 until the load voltage once again falls low enough to cause oscillator 23 to turn on.

The desired output voltage level maintained by operation of the shunt regulator section 12 may be different than that maintained by series regulator section 14 since the two regulator sections can operate essentially independently of one another, except for sharing transformer T42, diode D41 and capacitor C40, and except for having transistor Q45 turned off to prevent backflow of current through transistor Q45 when transistor Q44 is conducting.

The foregoing description of the overall operation of both regulator section in FIG. 1 is largely applicable to the operation of the preferred embodiment of the present invention shown in FIG. 2. Thus, the detailed operation of the power supply 10 in FIG. 2, as well as additional features of the present invention, may now be explained.

In FIG. 2, the individual components of series regulator section 14 which comprise the bias network 21 and Schmitt trigger 19 of FIG. 1 may be identified. Schmitt trigger 19 is comprised of transistors Q37, Q49 and Q50, resistors R36, R38, R51, R52 and R86, and capacitors C34 and C35, connected as shown. Bias network 21 is comprised of resistors R46 and R47, capacitor C48 and diode D124. Those skilled in the art will appreciate that the hysteresis of Schmitt trigger 19 is dependent in part on the relationship between the resistances of resistors R47 and R52, and that, therefore, resistor R52 may be considered to also be part of Schmitt trigger 19.

In the preferred embodiment shown in FIG. 2, the load voltage to be maintained by the series regulator section 14 is nominally 8.2 volts. The turn-on voltage of the Schmitt trigger 19 is approximately 0.7 volts, as determined by the series voltage drops of the bias voltage of the base-to-emitter junction of transistor Q37 and the voltage drop across resistor R52. Thus, the breakdown voltage of diode D39 has been selected to be 7.5 volts. When the load voltage at node 22 is less than 8.2 volts, insufficient avalanche current flows through diode D39 to provide a voltage drop of 0.7 volts across resistor R33, and therefore transistor Q37 is rendered nonconducting.

When transistor Q37 is nonconducting, current from node 22 flows through resistor R38 to the base of transistor Q49 turning transistor Q49 on hard. When transistor Q49 is conducting, the base current of switching transistor Q45 is able to flow through resistor R47 and the collector-to-emitter path of transistor Q49. Transistor Q45 is therefore turned on hard, and capacitor C48 is charged, making node 52 positive with respect to node 50.

As explained before with respect to FIG. 1, when transistor Q45 is conducting, current from node 20 flows through winding BA of transformer T42 into node 22. Because the combined impedance of winding BA and the emitter-to-collector path of transistor Q45 is very low, larger currents may flow, causing the voltage at node 22 to begin to rise. When the load voltage at node 22 rises very slightly above 8.2 volts, the avalanche current of zener diode D39 increases, increasing the voltage at node 40, which passes current through resistor R36 to further charge capacitor C34. When the voltage on capacitor C34 reaches combined voltage drops of the base-emitter junction bias voltage of transistor Q37 and the voltage drop across resistor R52, transistor Q37 begins conducting. (Note that the voltage drop across resistor R52 increased substantially when current began flowing through resistor R47.) When transistor Q37 goes into conduction, current flowing through resistor R38 is shunted to ground through resistor R52, causing transistor Q49 to turn off.

When transistor Q49 is off, no current flows through resistor R47, and this renders transistor Q45 nonconducting, which immediately stops the current flow through winding BA. As described earlier with respect to FIG. 1, the magnetic field generated by the flowing current in winding BA then begins to collapse, inducing a reverse bias voltage in winding BA. This in turn causes the voltage at node 38 to rise sharply. Despiking capacitor C53 helps attenuate this voltage spike. The rising voltage at node 38 causes the voltage at node 50 to rise even higher due to the residual charge on capacitor C48, thus helping reverse bias the base-to-emitter junction of transistor Q45 to assure that transistor Q45 is turned off quickly and solidly.

As explained earlier with respect to FIG. 1, the collapse of the magnetic field associated with winding BA induces a voltage in winding ED, which beneficially delivers energy stored in the transformer T42 to the load when the induced voltage in winding ED slightly exceeds the load voltage at node 22.

The hysteresis of Schmitt trigger 19 of series regulator section 14 in FIG. 2 is achieved as a result of the difference in voltages at node 40 required to turn transistor Q37 on and off. This difference results primarily from the varying voltage drop across resistor R52 produced by the presence or absence of current flow through resistor R47. The charging and discharging of capacitors C34 anc C35 through transistor Q37 and resistor R36 may also produce part of the hysteresis effect.

Turning to shunt switching regulator section 12 shown in FIG. 2, controlled oscillator 23 described in conjunction with FIG. 1 is preferably comprised of a 555 timer Z61, zener diode D55, line side timing resistor R56, a pair of load side timing resistors R57 and R58, smoothing capacitor C59, and timing capacitor C60, wired as shown.

Timer Z61 is comprised of the following internal components wired as shown: two comparators CP11 and CP12, three bias resistors R11, R12 and R13, set-reset flip flop FF11, npn discharge transistor Q11, and inverter NG11. The positive and negative inputs of comparator CP11 are known respectively as the threshold and control inputs of timer Z61. The negative input of comparator CP12 is known as the trigger input of timer Z61. The lead connected to the collector of discharge transistor Q11 is known as the discharge input of timer Z61.

The operation of shunt regulator section 12 may now be explained in detail. When output Q of flip flop FF11 is high, node 32 is low, and therefore shunt transistor Q44 is on and discharge transistor Q11 is off. With transistor Q11 off, the battery begins charging timing capacitor C60 through timing resistor R56, and any voltage present at node 22 also begins charging capacitor C60 through resistors R57 and R58.

Bias resistors R11, R12 and R13 in timer Z61 are of equal value. Thus, when the voltage across capacitor C60 reaches two-thirds of the load voltage at node 22, comparator CP11 resets flip-flop FF11. Node 32 thus goes high, and discharge transistor Q11 begins conducting, discharging timing capacitor C60 through resistor R58. Node 34 goes low, turning off transistor Q44. When the voltage across timing capacitor C60 falls to one-third of the load voltage at node 22, comparator CP12 sets flip-flop FF11, and noe 32 returns to its low state. Transistor Q11 no longer conducts, thus allowing the charging of timing capacitor C60 to be repeated. In this manner, the output of timer Z61 oscillates as long as the voltage on capacitor C60 rises to the voltage on node 28 and falls to the voltage on node 30.

The voltage boosting function of shunt regulator section 12 shown in FIG. 2 may now be further appreciated. When the output of timer Z61 at node 34 is high, shunt transistor Q44 is turned on hard through resistor R54. When transistor Q44 conducts, winding BA is effectively shorted to ground 18, which immediately results in a steadily increasing current flowing through winding BA. Before this current reaches the saturation point of transistor Q44 or winding BA, the output of timer Z61 goes low, turning transistor Q44 off.

When node 34 is high, transistor Q50 is turned on through base resistor R51. This causes transistor Q49 and hence switching transistor Q45 to immediately stop conducting. Turning off transistor Q45 prevents current from flowing from the load at node 22 through transistor Q45 to node 38, which is near zero volts when shunt transistor Q44 is conducting.

As explained earlier with respect to FIG. 1, when node 34 goes low, shunt transistor Q44 is turned off. The energy is stored in the core of transformer T42 as a result of shunting the current through transistor Q44 towards ground 18 is then directed into the load via one or both of two separate ways, namely by inducing voltage in winding ED and by turning on switching transistor Q45 as soon as transistor Q44 is turned off. This second path is possible because when the output of timer Z61 goes low, transistor Q50 also turns off, thus allowing the voltage at node 44 to rise, turning on transistor Q49 and Q45, provided the transistor Q37 has not already been turned on. Switching transistor Q45 once on will conduct current from winding BA to the load unit the load voltage has risen sufficiently to turn on transistor Q37, which turns off transistor Q45 as previously explained.

Returning to shunt regulator section 12, additional features thereof may now be explained. The function of resistor R56 is to allow the battery voltage at node 20 to influence the duty cycle of the oscillations of timer Z61 by influencing the charge and discharge rates of timing capacitor C60. For example, if the battery voltage is around five volts, that is quite low, relatively little current will flow from node 20 through resistor R56 to help the charging of capacitor C60 via resistors R57 and R58. When timing capacitor C60 is charging relatively slowly, the output of timer Z61 remains high longer, thus allowing larger currents to be developed in the shunt path through winding BA and transistor Q44. Conversely, when the battery voltage is around nine volts, that is relatively higher, the current flowing through resistor R56 substantially speeds up the charging of capacitor C60. The voltage across capacitor C60 more quickly reaches the threshold voltage required to turn on comparator CP11, which turns off the shunt transistor Q44. In this manner, higher battery voltage reduces the magnitude and duration of the shunt current, thus reducing the energy available in winding BA to boost the load voltage.

It will also be observed that changes in battery voltage inversely affects the time required to discharge capacitor C60. When the battery voltage is high, the charging current provided to capacitor C60 through resistor R56 is relatively high, thus slowing down the discharge rate of capacitor C60, and increasing the off time of the oscillations in the output of timer Z61. Similarly, when battery voltage is low, little if any current is contributed through resistor R56 to charge capacitor C60. Capacitor C60 will then discharge at a quicker rate, resulting in a shorter off period for the oscillations. In this manner, the duty cycle of the output of timer Z61, which is directly proportional to the amount of voltage boost provided by shunt regulator section 12, is inversely proportional to the changes in battery voltage.

Figure 3:
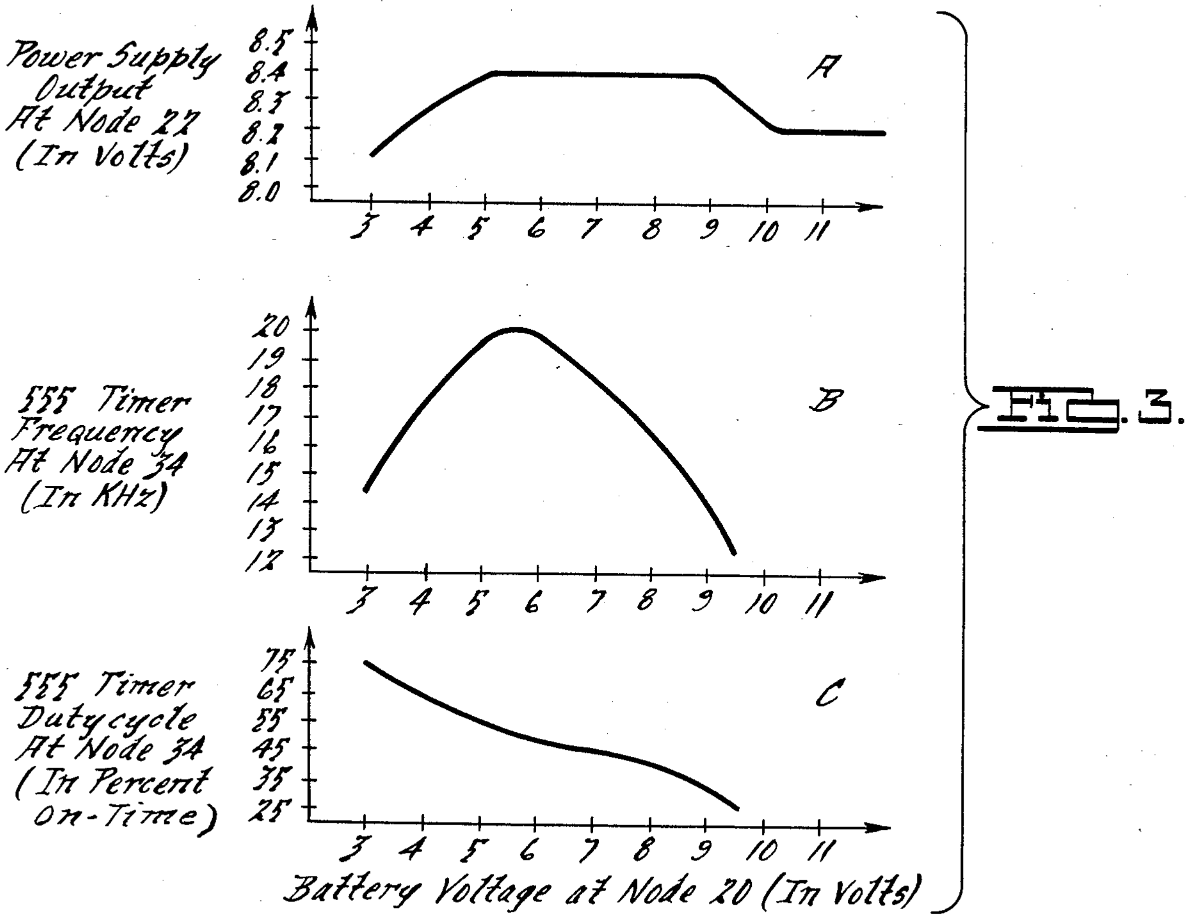
FIG. 3 is a series of graphs A, B and C of illustrative performance curves of the shunt regulator section of the power supply in FIG. 2 shown as a function of battery voltage.

The three graphs A, B, and C of FIG. 3 represent experimentally determined performance curves for the power supply 10 shown in FIG. 2 when it is hooked up to a thirteen ohm load. These graphs help illustrate how shunt regulator section 12 shown in FIG. 2 achieves its variable voltage boosting function. All three graphs use the same horizontal axis, namely battery voltage at node 20 expressed in volts. Graph B of FIG. 3 depicts how the frequency of oscillations at the output of the 555 timer Z61 at node 34 varies with battery voltage. Graph C shows how the duty cycle of the output of timer Z61 at node 34, which is expressed on the vertical axis in percent on-time, varies with the battery voltage at node 20. Graph C pictorially illustrates that the duty cycle is inversely proportional to the changes in battery voltage as described above.

The purpose of zener diode D55 is to function as a cut-off device: it turns off the output of timer Z61 to limit the maximum output voltage level at node 22 produced during the voltage boosting mode. The breakdown voltage of zener diode D55, which is 6.2 volts in the preferred embodiment shown in FIG. 2, determines the load voltage at which timer Z61 will no longer oscillate. When the load voltage at node 22 minus the breakdown voltage of zener diode 55 exceeds the voltage drop across bias resistors R11 and R12, zener diode D55 will avalanche sufficiently to keep voltage across capacitor C60 from falling to the voltage at node 30, thus preventing comparator CP12 from setting flip flop FF11. This avalanche current is effectively charges capacitor C60 faster than it can be discharged through timing resistor R58 and discharge transistor Q11. As long as the load voltage on conductor 22 is high enough to keep the comparator CP12 from setting flip flop FF11, the output of timer Z61 will be kept low. When the load voltage drops long enough for the capacitor C60 to discharge to a level sufficient to cause comparator CP12 to set flip flop FF11, shunt regulator section 12 will begin supplying electrical power to the load, and the power supply 10 will again operate in its voltage-boosting mode. Graph A of FIG. 3 shows how the output voltage at node 22 in the preferred embodiment of FIG. 2 varies as a function of battery voltage at node 20. As can be seen best in Graph C, the power supply 10 no longer operates in the voltage boosting mode for any significant percentage of time when the battery voltage exceeds roughly ten volts. Graph A shows that in the voltage-dropping mode, which occurs primarily above battery voltages in excess of roughly ten volts, the output of the power supply 10 shown in FIG. 2 is generally maintained at 8.2 volts. This output voltage level is controlled by operation of series regulator section 14 as previously described. The higher output voltage level shown in Graph A for battery voltages from 3.5 to 10.0 volts is controlled by operation of shunt regulator section 12 as previously described. In particular, where the output voltage level peaks and is held at 8.4 volts as shown in Graph A, the action of diode D55 avalanching to charge capacitor C60 and to thus turn off the output of timer Z61 at node 34 is responsible for limiting the maximum output voltage level to 8.4 volts. The increase in the output voltage level at node 22 for battery voltages below ten volts as shown in Graph A is deemed beneficial to the operation of a microprocessor-based electronic control system for automotive engines in that is provides a "cushion" of extra power from the power supply 10 when the battery voltage is below normal. Battery voltages may in some instances rapidly fluctuate during cold cranking conditions, making the cushion of extra power at that time desirable. Additionally, at extremely low temperatures, the internal resistance of filter capacitor C40 may increase appreciably, thus reducing the amount of power effectively available per unit of charge stored in capacitor C40. The cushion of extra power helps compensate for the low temperature performance characteristics of capacitor C40.

Graph A of FIG. 3 illustrates that the output voltage levels of the two regulator sections 12 and 14 of the present invention may, if desired, be made different as previously discussed.

During the start-up of the power supply 10, bypass resistor R43 bypasses switching transistor Q45 to provide a path for sufficient leakage current to travel from node 38 to node 22 in order to turn on transistor Q49 to allow transistor Q45 to start conducting. If resistor R43 were removed from the circuit of FIG. 2, series regulator section 14 would not energize during start-up. This is because the current flowing through resistor R56 and diode D55 to node 22 is too small to turn on transistor Q49, and thereby power up series regulator section 14. Resistor R43 has been sized in FIG. 2 so that if node 22, which is the output of the power supply 10, has a short to ground, the bias voltage established by leakage current through resistor R43 will be insufficient to turn transistor Q49, thereby protecting transistor Q45 from damage which could otherwise occur if transistor Q45 were turned on and supplied current continuously to a grounded node 22.

While it will be apparent that the preferred embodiment of the invention is well calculated to fulfill the objects above stated, it will be appreciated that the invention is susceptible to modification, variation and change without departing from the proper scope or fair meaning of the subjoined claims.

I claim:

1. A power supply, having an input node and an output node, for supplying DC electrical power to an electronic control system of an engine, which comprises:

a series switching regulator section for regulating the voltage at the output node having a transformer with primary and secondary windings, switching means for switching on and off the flow of current from the input node through the primary winding to the output node, and switching control circuit means for controlling the operation of the switching means in response to the voltage at the output node;

a shunt switching regulator section for boosting the voltage supplied at the input node to produce a desired voltage at the output node when the voltage at the input node is below a predetermined value, the shunt switching regulator section having shunt means for intermittently shunting current through the primary winding towards ground and oscillator circuit means for controlling the operation of the shunt means;

bypass resistor means for bypassing the switching means during start-up of the power supply to provide a path for sufficient leakage current to turn on the switching control circuit means.

2. A power supply as recited in claim 1 wherein the bypass resistor means is sized such that a short at the output node will prohibit the leakage current from turning on the switching control circuit means.

3. A power supply, having an input node and an output node, for supplying DC electrical power to an electronic control system of an engine, which comprises:

a series switching regulator section for regulating the voltage at the output node having a transformer with primary and secondary windings, switching means for switching on and off the flow of current from the input node through the primary winding to the output node, and switching control circuit means for controlling the operation of the switching means in response to the voltage at the output node;

a shunt switching regulator section for boosting the voltage supplied at the input node to produce a desired voltage at the output node when the voltage at the input node is below a predetermined value, the shunt switching regulator section having shunt means for intermittently shunting current through the primary winding towards ground and oscillator circuit means for controlling the operation of the shunt means;

a free-wheeling diode, and wherein the free-wheeling diode and the secondary winding are connected in series combination between the output node and ground for allowing current to flow through the secondary winding into the output node;

whereby excess energy stored in the transformer on account of current flowing through the primary winding may be beneficially transferred via magnetic coupling and the secondary winding to the output node.

4. A power supply as recited in claim 3 wherein the switching means is provided with a control gate connected to the switching control circuit means.

5. A power supply as recited in claim 3 wherein the shunt means is provided with a control gate connected to the oscillator circuit means.

6. A power supply as recited in claim 3 wherein the oscillator circuit means is connected to the switching control circuit means in order to signal the switching control circuit means to turn off the switching means when the shunt means is shunting current through the primary winding towards ground.

7. A power supply as recited in claim 6 wherein the oscillator circuit means controls the intermittent shunting of current through the primary winding towards ground by varying the duty cycle of the oscillations produced by the oscillator circuit means, thereby varying the increase in voltage supplied to the output node by the transformer in proportion to the increase in the duty cycle of the oscillations.

8. A regulated power supply, having an input node, an output node and a ground, for supplying DC electrical power to an electronic control system in an automotive engine, which comprises:

a series switching regulator section for regulating the voltage at the output node having (a) a transformer provided with a primary winding and a secondary winding, each winding having two leads, the first lead of the primary winding connected to the input node, (b) a free-wheeling diode connected in series with the secondary winding, the series combination of the free-wheeling diode and the secondary winding connected between the output node and ground, (c) a filter capacitor connected between the output node and ground for smoothing the voltage at the output node, (d) a solid-state switching device, connected between the second lead of the primary winding and the output node and provided with a control gate, for switching on and off the flow of current from the primary winding to the output node, and (e) a switching control circuit means, connected to the control gate of the switching device and to the output node, for controlling the operation of the switching device in response to the voltage at the output node; and a shunt switching regulator section for boosting the voltage supplied at the input node to produce the desired voltage at the output node when the voltage at the input node is below a predetermined value, having (a) a solid-state shunt device, connected between the second lead of the primary winding and ground and provided with a control gate, for intermittently shunting current from the primary winding to ground in order to store magnetic energy in the transformer for disbursement of the stored energy through the secondary winding to the output node when the shunt device is turned off, and (b) an oscillator connected to the input and output nodes and provided with an output connected to the control gate of the shunt device and to the switching control circuit means, for controlling the operation of the shunt device in response to voltages at the input and output nodes, and for signaling the switching control circuit means to turn off the switching device when the shunt device is turned on.

9. A regulated power supply as recited in claim 8 wherein the oscillator also includes a zener diode for cutting off the oscillations produced by the oscillator when the voltage on the output node reaches a predetermined point.

10. A regulated power supply as recited in claim 8 wherein the switching device of the regulator section is a power transistor.

11. A regulated power supply as recited in claim 8 wherein the shunt device of the boost section is a power transistor.

12. A regulated power supply as recited in claim 8 wherein the oscillator controls the intermittent shunting of current from the primary winding to ground by varying the duty cycle of the oscillations produced by the oscillator in inverse proportion to the change in voltage at the input node.

13. A regulated power supply as recited in claim 12 wherein the oscillator includes and is constructed around a 555 timer chip having a trigger input, and also includes a timing capacitor connected between the trigger input and ground, a pair of load side timing resistors in series between the output node and the trigger input, and a line side timing resistor connected between the input node and trigger input, the timing capacitor and three timing resistors in cooperation with the timer chip functioning to alter the duty cycle of the oscillations at the output of the oscillator circuit in inverse proportion to the change in voltage at the input node.

14. A regulated power supply as recited in claim 8 wherein the switching control circuit means includes a Schmitt trigger circuit for monitoring the voltage at the output node and generating a signal that indicates when the switching device may be turned on and off.

15. A regulated power supply as recited in claim 14 that also includes a resistor and a zener diode for providing a feedback signal to the Schmitt trigger circuit indicative of the voltage at the output node.

* * * * *